United States Patent [19]

Ikeda et al.

[11] Patent Number: 5,070,288
[45] Date of Patent: Dec. 3, 1991

[54] REFERENCE POINT RETURN SYSTEM

[75] Inventors: Yoshiaki Ikeda, Minamitsuru; Mitsuru Kuwasawa, Gotenba; Kenichi Ito, Minamitsuru, all of Japan

[73] Assignee: Fanuc Ltd., Minimatsura, Japan

[21] Appl. No.: 476,416

[22] PCT Filed: Sep. 29, 1989

[86] PCT No.: PCT/JP89/00998
§ 371 Date: May 31, 1990
§ 102(e) Date: May 31, 1990

[87] PCT Pub. No.: WO90/04815
PCT Pub. Date: May 3, 1990

[30] Foreign Application Priority Data
Oct. 20, 1988 [JP] Japan .................. 63-264873

[51] Int. Cl.⁵ .................. G06F 15/46; G05B 11/18
[52] U.S. Cl. .................. 318/618; 318/592; 318/593; 318/594; 318/626; 364/474.3; 364/474.34
[58] Field of Search .................. 318/560-646; 364/474, 513

[56] References Cited

U.S. PATENT DOCUMENTS

| 4,225,928 | 9/1980 | Ohkubo | 318/594 X |
| 4,481,588 | 11/1984 | Komiya | 318/626 X |
| 4,513,234 | 4/1985 | Nozawa et al. | 318/594 |
| 4,680,520 | 7/1987 | Toyoda et al. | 318/594 |
| 4,782,275 | 11/1988 | Sakamoto et al. | 318/569 |
| 4,847,777 | 7/1989 | Konno | 318/592 X |

Primary Examiner—Paul Ip
Attorney, Agent, or Firm—Staas & Halsey

[57] ABSTRACT

A system for carrying out reference point return in a numerical control device is provided, including a deceleration dog having a short length and arranged at a machine table, a deceleration limit switch operated by the deceleration dog, for generating a deceleration start signal, and a time setting device (6) for setting a deceleration time, starting with a generation of the deceleration start signal and ending with a generation of a deceleration end signal, and a slow-speed travel time. A reference point return processing device (5) starts a deceleration of the machine table in response to the deceleration start signal, and stops the machine table at a first electrical grid point reached by the machine table after the slow-speed travel time has elapsed after the passing of the deceleration time.

4 Claims, 4 Drawing Sheets

REFERENCE POINT RETURN SYSTEM

BACKGROUND OF THE INVENTION

1. Technical Field

The present invention relates to a system for carrying out a reference point return in a numerical control device, and more particularly, to a reference point return system by which an adjustment of a deceleration dog on a machine side is simplified.

2. Background Art

Numerical control devices have a reference point return function of returning a table or the like of a machine tool to a reference point, whereby the table or the like is manually moved toward the reference point after the power is turned on, and is decelerated in accordance with a signal from a deceleration limit switch. After the deceleration is ended, the table or the like is then moved at a constant low speed (decelerated speed), and is stopped at a point in an electrical grid at which the deceleration limit switch loses contact with the deceleration dog and thus is closed.

FIG. 4 is a diagram of a conventional reference point return system wherein, when a machine table 1 to which a deceleration dog 3a is secured is moved in the direction indicated by the arrow in the figure, a deceleration limit switch 2 is operated, and when a deceleration signal DEC is turned "off", a reference point return processing means 5a of a numerical control device (CNC) 4a reduces the speed of the machine table 1 by decelerating a servomotor, not shown. Thereafter, the machine table 1 is moved at a constant low speed, and when it reaches a point in an electrical grid at which the deceleration dog 3a has moved past the deceleration limit switch 2, and accordingly the deceleration signal is turned "on", the processing means stops the machine table at that point to thereby end the reference point return process.

The contact of the deceleration limit switch is a break contact, and therefore, the on/off switching thereof is converse to the contact/non-contact with the deceleration dog. Namely, while the deceleration dog 3a is running over the deceleration limit switch 2, the deceleration signal DEC is off.

The conventional reference point return system requires a deceleration dog having a considerable length, and this length must be set in accordance with the deceleration distance. Furthermore, an adjustment is required so that the deceleration limit switch 2 is turned on when the trailing end of the deceleration dog is located between electrical grid points.

This adjustment is extremely minute, because the pitch of the electrical grid is about several millimeters to 10 mm, and a small misadjustment may cause a deviation of one pitch. Moreover, if the deceleration dog is located under the machine table 1, for example, an external cover and the like must be removed to enable an accurate adjustment of the position of the deceleration dog, thus making assembling and maintenance complicated.

SUMMARY OF THE INVENTION

The present invention was developed in view of the above circumstances, and an object thereof is to provide a reference point return system by which an adjustment of a deceleration dog on a machine side is simplified.

To achieve the above object, the present invention provides a system for carrying out a reference point return in a numerical control device, including a deceleration dog having a short length and arranged at a machine table, a deceleration limit switch operated by the deceleration dog, for generating a deceleration start signal, time setting means for setting a deceleration time starting with a generation of the deceleration start signal and ending with a generation of a deceleration end signal, and a slow-speed travel time, and a reference point return processing means for starting a deceleration of the machine table in response to the deceleration start signal, and stopping the machine table at a first electrical grid point reached by the machine table after the slow-speed travel time has elapsed after the passing of the deceleration time, to thereby carry out a reference point return.

The reference point return processing means reduces the speed of the machine table in response to the deceleration start signal, and stops the table at a first electrical grid point reached by the table after the slow-speed travel time has elapsed after the passing of the deceleration time, to thereby carry out a reference point return action.

DESCRIPTION OF THE PREFERRED EMBODIMENTS

An embodiment of the present invention will be described with reference to the drawings.

Figure 1:
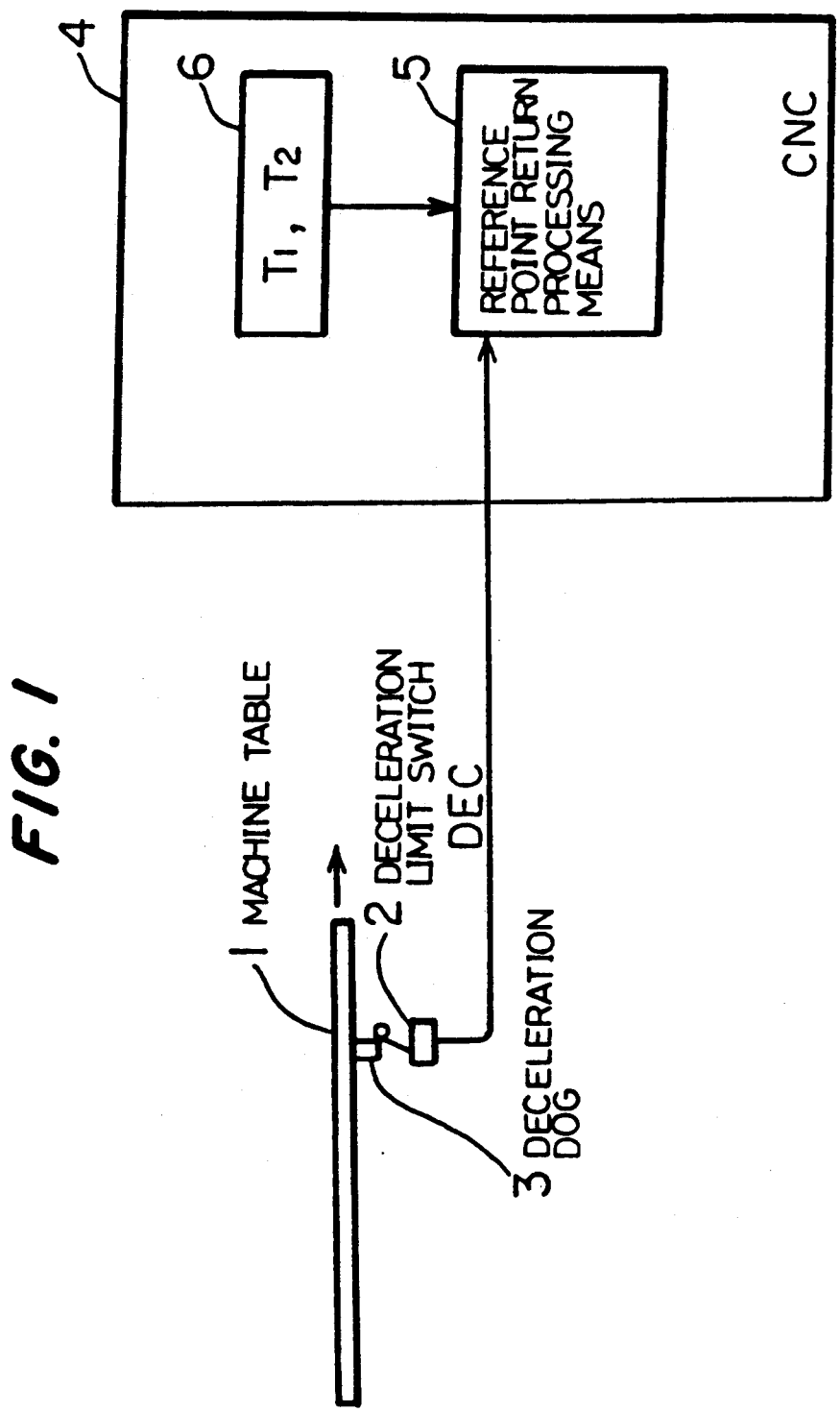
FIG. 1 is a diagram of a reference point return system according to the present invention.

FIG. 1 is a diagram illustrating a reference point return system according to the present invention, wherein a deceleration dog 3 is secured to the underside of a machine table 1. The dog 3 has a short length, and serves merely to cause a deceleration limit switch 2 to output a deceleration start signal DEC.

The deceleration start signal DEC from the deceleration limit switch 2 is input to a reference point return processing means 5 of a numerical control device (CNC) 4, and a time setting means 6 outputs a deceleration time T1 and a slow-speed travel time T2 to the reference point return processing means 5. These time periods are previously stored in a nonvolatile memory or the like, as parameters.

The reference point return processing means 5 carries out a reference point return process in accordance with the deceleration start signal DEC and the above time periods.

Figure 2:
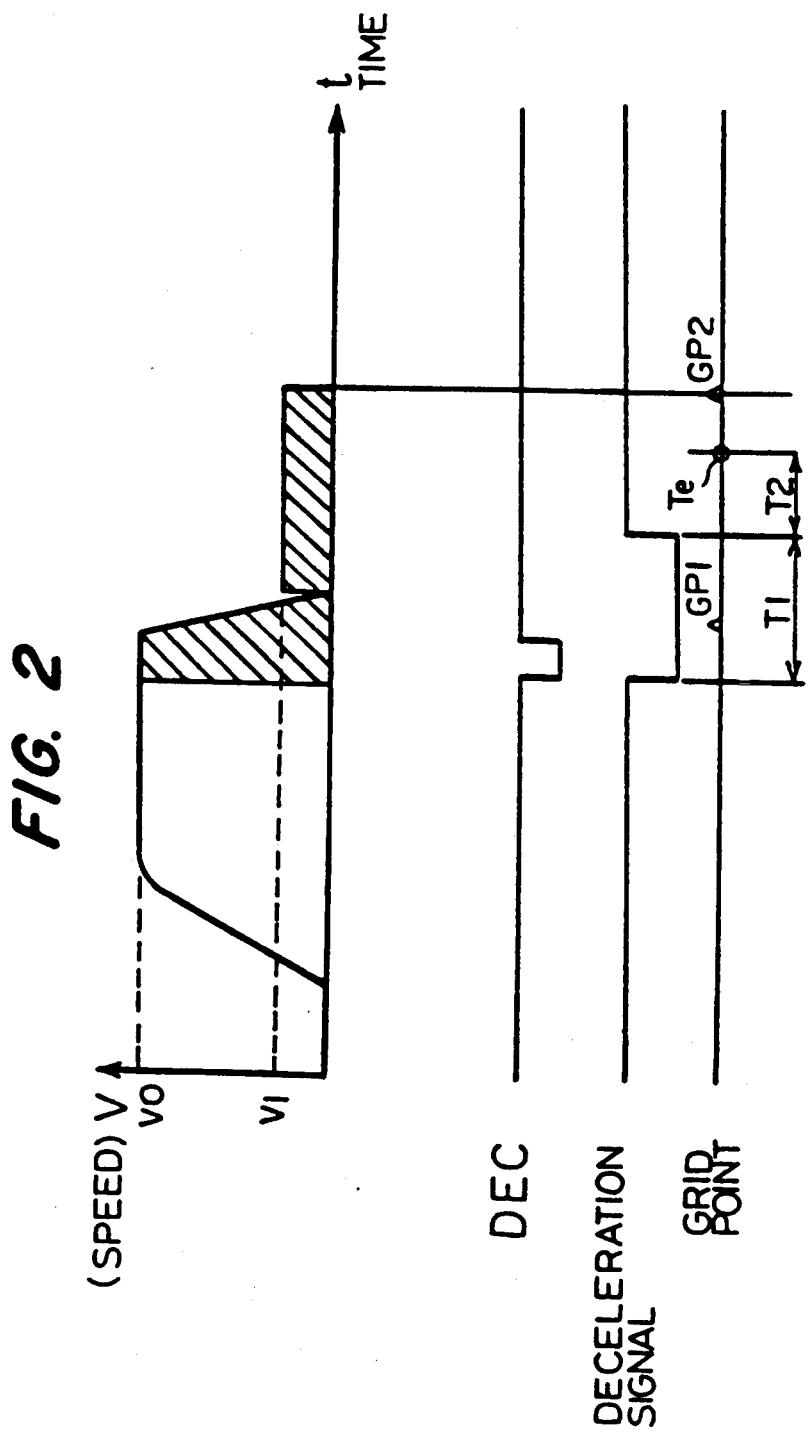
FIG. 2 is a timing chart showing a reference point return action.

The reference point return process executed by the reference point return processing means will be now described, with reference to the timing chart of FIG. 2. First, the mode of an operator panel is set in a reference point return mode and a jog button is pushed, whereby the machine table 1 is moved toward the reference point at a rapid feed rate v0. When the deceleration dog 3 reaches the deceleration limit switch 2, the deceleration start signal DEC turns off and a deceleration of the machine table 1 is started. After the deceleration time T1 has passed, the machine table 1 is moved at a post-deceleration speed v1 and is stopped at a grid point GP2 reached after the lapse of the slow-speed travel time T2, to thereby end the reference point return process.

The time T1 is set according to the length of a conventional deceleration dog, and the time T2 may be set as a parameter. Accordingly, the point Te can be easily set between grid points GP1 and GP2.

Alternatively, the reference point may be a point spaced by a predetermined distance from the above-mentioned grid point GP2, and this predetermined distance may be set as a parameter or the like.

Figure 3:
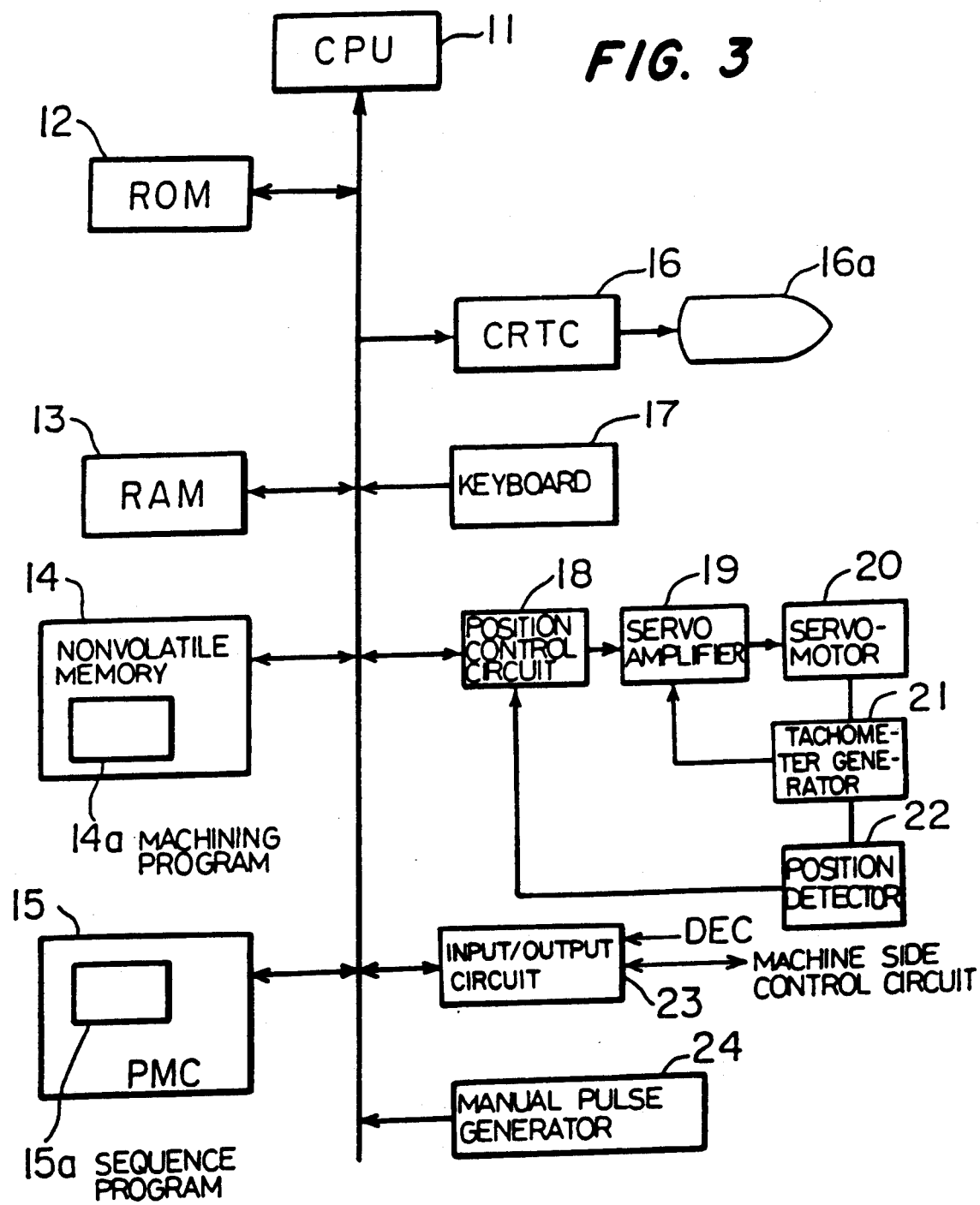
FIG. 3 is a block diagram showing a numerical control device for carrying out the present invention.
Figure 4:
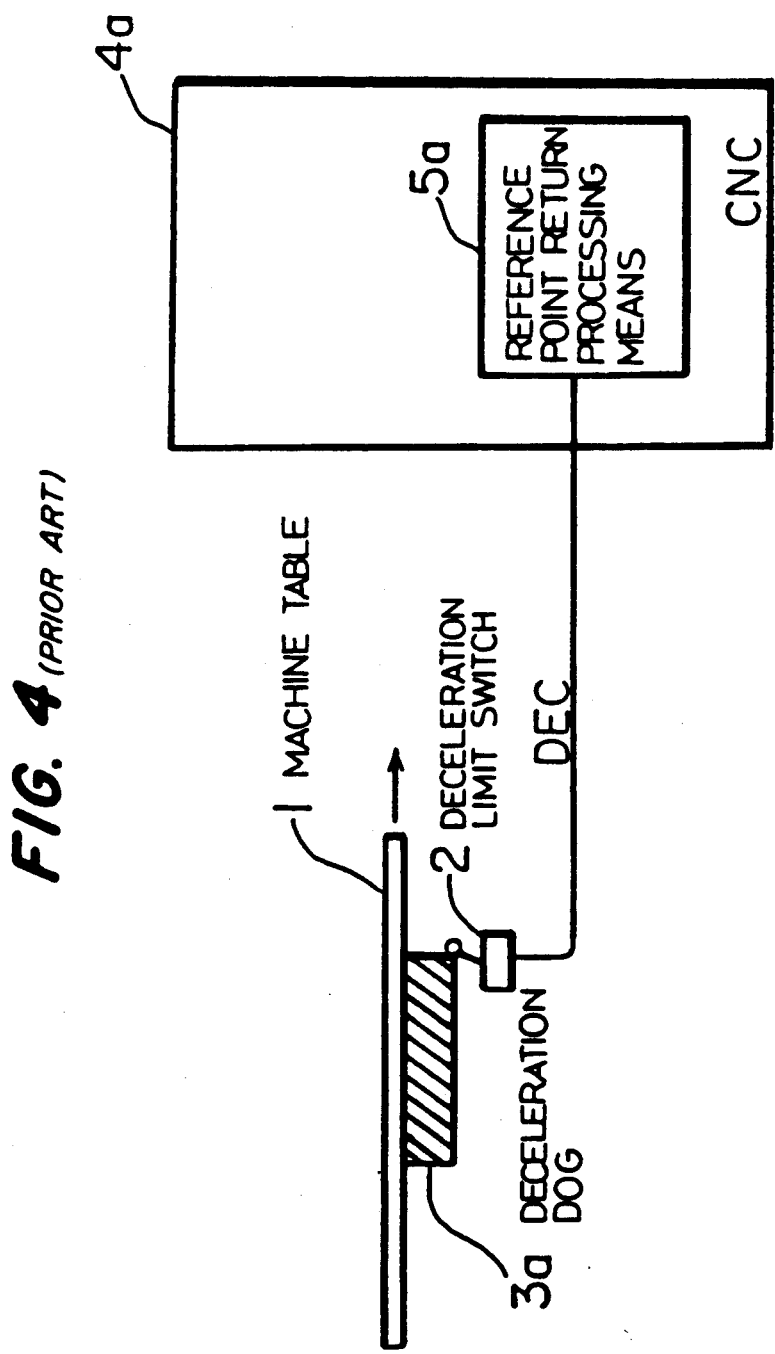
FIG. 4 is a diagram of a conventional reference point return system.

The hardware for carrying out the present invention will now be described. FIG. 3 illustrates the arrangement of the hardware of the numerical control device (CNC) for carrying out the present invention. In the figure, numeral 11 denotes a processor (CPU) for global control; 12 denotes a ROM for storing a control program; 13 denotes a RAM for storing various data; 14 denotes a nonvolatile memory for storing a machining program and parameters, etc.; and 14a denotes a machining program.

Numeral 15 denotes a programmable machine controller (PMC) which converts received commands, such as M-function and T-function, etc., into signals for controlling a machine tool, and outputs the converted signals. These control actions are processed by a sequence program 15a. Numeral 16 denotes a display control circuit for converting a digital signal into a display signal; 16a denotes a display device including a CRT, liquid-crystal display unit, or the like; and 17 denotes a keyboard used for inputting various data.

Numeral 18 denotes a position control circuit for controlling a servomotor; 19 denotes a servo amplifier for controlling the speed of the servomotor; 20 denotes the servomotor; 21 denotes a tachometer generator for effecting a speed feedback; and 22 denotes a position detector including a pulse coder, optical scale, or the like. The required number of these elements corresponds to the number of axes, but only those necessary for one axis are illustrated.

Numeral 23 denotes an input/output circuit for transferring digital signals with respect to an external unit. The input/output circuit 23 receives the deceleration start signal DEC and outputs a tool select signal (T signal) for controlling tool changes, etc., to a machine side control circuit. Numeral 24 denotes a manual pulse generator for digitally moving individual axes.

In the above description, only one processor is used, but a plurality of processors may be used to increase the processing speed.

As described above, according to the present invention, the deceleration time and the slow-speed travel time are set as parameters, and accordingly, it is not necessary to change the length or the like of the deceleration dog on the machine side, or to adjust the position of the deceleration dog, thereby facilitating the assembling and maintenance of machine tools.

Further, by adjusting the slow-speed travel time and the like, it is possible to eliminate disadvantages such as a deviation of the reference point.

We claim:

1. A system for carrying out a reference point return in a numerical control device, comprising:
    a deceleration dog having a short length and arranged at a machine table;
    a deceleration limit switch operated by the deceleration dog, for generating only a deceleration start signal;
    means for storing a deceleration end signal beforehand;
    circuit means for setting a deceleration time, starting with the generation of the deceleration start signal and ending with the generation of the deceleration end signal, and a slow-speed travel time; and
    reference point return processing means for starting a deceleration of the machine table in response to the deceleration start signal, and stopping the machine table at a first electrical grid point reached by the machine table after the deceleration time and slow-speed travel time have elapsed, to thereby carry out a reference point return.

2. A system according to claim 1, wherein said reference point is spaced by a predetermined distance from said first electrical grid point.

3. A method for carrying out a reference point return in a numeral control device, including a deceleration dog arranged at a machine table and a deceleration limit switch operated by the deceleration dog, for generating only a deceleration start signal, comprising the steps of:
    setting and storing a deceleration end signal beforehand;
    moving the table so that the dog and deceleration limiting switch make contact and said switch generates a deceleration start signal;
    setting a deceleration time, starting with the generation of the deceleration start signal and ending with a generation of the deceleration end signal, and a slow-speed travel time;
    starting a deceleration of the machine table in response to the deceleration start signal; and
    stopping the machine table at a first electrical grid point reached by the machine table after the deceleration time and slow-speed travel time have elapsed.

4. The method according to claim 3, further comprising the step of:
    spacing the reference point by a predetermined distance from said first electrical grid point.

* * * * *